United States Patent [19]

Clark

[11] Patent Number: 4,805,225
[45] Date of Patent: Feb. 14, 1989

[54] PATTERN RECOGNITION METHOD AND APPARATUS

[75] Inventor: David M. Clark, New Paltz, N.Y.

[73] Assignee: The Research Foundation of the State University of New York, Albany, N.Y.

[21] Appl. No.: 927,832

[22] Filed: Nov. 6, 1986

[51] Int. Cl.$^4$ .......................... G06K 9/62; G06F 15/18
[52] U.S. Cl. ........................................ 382/15; 382/37; 382/39
[58] Field of Search .................. 382/14, 15, 37, 38, 382/39

[56] References Cited

U.S. PATENT DOCUMENTS

| | | | |
|---|---|---|---|
| 3,233,219 | 2/1966 | Atrubin et al. | 382/39 |
| 3,325,787 | 6/1967 | Angell et al. | 382/14 |
| 3,588,823 | 6/1971 | Chow et al. | 382/15 |
| 3,634,822 | 1/1972 | Chow | 382/39 |
| 3,988,715 | 10/1976 | Mullan et al. | 382/39 |
| 4,011,547 | 3/1977 | Kimmel | 340/172.5 |
| 4,012,634 | 3/1977 | Bouton et al. | 250/201 |
| 4,060,694 | 11/1977 | Suzuki et al. | 179/150 |
| 4,066,999 | 1/1978 | Spanjersberg | 382/14 |
| 4,144,582 | 3/1979 | Hyatt | 364/900 |
| 4,256,924 | 3/1981 | Sakoe | 179/1 SD |
| 4,286,330 | 8/1981 | Isaacson | 364/900 |
| 4,319,221 | 3/1982 | Sakoe | 340/146.3 Q |
| 4,403,114 | 9/1983 | Sakoe | 175/1.5 D |
| 4,415,767 | 11/1983 | Gill et al. | 381/45 |
| 4,432,096 | 2/1984 | Bunge | 381/43 |
| 4,443,855 | 4/1984 | Bishop et al. | 364/513 |
| 4,450,530 | 5/1984 | Llinas et al. | 364/513 |
| 4,479,241 | 10/1984 | Buckley | 382/15 |
| 4,490,660 | 12/1984 | Tsuchihashi | 318/565 |
| 4,490,847 | 12/1984 | Aleksander et al. | 382/10 |
| 4,504,970 | 3/1985 | Werth et al. | 382/14 |
| 4,531,192 | 7/1985 | Cook | 364/513 |
| 4,557,386 | 12/1985 | Buckley et al. | 209/556 |
| 4,559,602 | 12/1985 | Bates, Jr. | 364/487 |
| 4,570,232 | 2/1986 | Shikano | 364/513.5 |
| 4,670,848 | 6/1987 | Schramm | 382/15 |
| 4,682,365 | 7/1987 | Orita et al. | 382/14 |

OTHER PUBLICATIONS

Fukushina et al., "Neocognitron: A Neural Network Model for a Mechanism of Visual Pattern Recognition", IEEE Transactions on Systems Man. and Cybernetics, vol. SMC-13, No. 5, pp. 826-834.

Primary Examiner—Leo H. Boudreau
Assistant Examiner—Donald J. Daley
Attorney, Agent, or Firm—Morgan & Finnegan

[57] ABSTRACT

A general purpose pattern recognition method and apparatus comprises a hierarchical network of basic recognizers, each basic recognizer being capable of discriminating a particular feature at a lower level and providing outputs for higher levels of abstraction. In a learning mode, a series of sample patterns having a feature are presented as input along with several near-miss patterns. The pattern recognition apparatus learns to recognize the feature by keeping track of which basic recognizers detect patterns containing the feature. In a recognition mode, the invention determines if a presented pattern has the feature by polling the basic recognizers. A summation algorithm calculates the likelihood that the presented pattern has a particular feature.

16 Claims, 5 Drawing Sheets

FIG. 6

FEATURE 0: $A_0$, $B_0$, $C_0$, $D_0$
FEATURE 1: $A_1$, $B_1$, $C_1$, $D_1$
FEATURE 2: $A_2$, $B_2$, $C_2$, $D_2$
FEATURE 3: $A_3$, $B_3$, $C_3$, $D_3$
FEATURE 4: $A_4$, $B_4$, $C_4$, $D_4$

PATTERN RECOGNITION METHOD AND APPARATUS

BACKGROUND OF THE INVENTION

The invention relates to artificial intelligence systems. More particularly, the invention relates to methods and apparatus for general purpose pattern recognition.

Numerous pattern recognition methodologies have been developed in the fields of natrual language processing and machine vision. Such methodologies have previously involved programming computers with specialized algorithms for solving a limited class of problems. The computational models upon which such systems are based, while occasionally attempting to model the cognitive or psychological aspects of learning, ordinarily provide no relation to physiological models such as the biological vision system believed to be present in the visual cortex of the human brain.

Biological learning systems are believed to involve extremely fast and accurate forms of pattern recognition. Furthermore, and perhaps more importantly, the human brain is belived to have tremendous pattern learning and abstraction capabilities. Combined, these abilities make the human brain and extraordinary general purpose pattern recognizer. If the biological pattern learning and recognition methodology could be discovered and understood, it would be theoretically possible to design effective pattern recognition hardware and software to mimic the natural systems.

Several prior neural-network-type pattern recognition models which attempt to mimic biological systems have been under investigation. Fukushima et al in their paper, 13 *IEEE Transactions on Man, Systems and Cybernetics* 826–834 (September/October 1983), "Neocognitron: A Neural Network Model for a Mechanism of Visual Pattern Recognition" discuss a neural network application which recognizes single characters but is not adapted to recognize a broad class of patterns. Feldman and Ballard, *Cognitive Science* 6, 205–254 (1982), "Connectionist Models and Their Properties" also discusses the development of neural network models. While some prior methods have achieved limited success in terms of recognition of particular patterns, no known systems in the prior art have succeeded in providing a satisfactory general purpose pattern recognition method and apparatus.

SUMMARY OF THE INVENTION

With the foregoing in mind, it is an object of the invention to provide a general purpose pattern recognition method and apparatus which is capable of both pattern learning and pattern recognition.

It is a further object of the invention to provide a general purpose pattern recognition method and apparatus which may be configured to recognize a wide variety of patterns, including visual, aural, or other sensory patterns.

These and other objects of the invention are met by providing a hierarchically organized neural network of basic recognition devices. One embodiment of the invention comprises an electronic sensory device, a digitizer, a primary data array ("primary retina"), a network of basic recognizers, and a control unit. The electronic sensor device converts an external pattern into an electronic signal. The digitizer partitions the signal into segments and assigns a value to each segment. These values are entered on the primary retina which provides inputs to a series of basic recognizers capable of recognizing patterns on the primary retina.

Preferred embodiments of the invention include both a learning mode and a recognition mode. In a preferred learning mode, a plurality of different patterns having a common feature are displayed on the primary retina. The basic recognizers are trained to recognize the feature in other input patterns. The basic recognizers of higher level series recognize more abstract features of the original input patterns.

In a preferred embodiment, each basic recognizer comprises a plurality of logically independent, branching recognition elements. Each recognition element has a number of input connectors connected to either outer bits of the primary retina, output bits of lower level basic recognizers, or both. The recognition elements are programmed or set to recognize a single subpattern of a pattern presented on a lower level retina. The recognition elements maintain a count during a learning mode which is incremented every time a presented subpattern is recognized by the particular recognition element. This count is then used during recognition mode to measure the likelihood that a pattern presented to the particular recognition element has a particular feature. Particularly, when a test pattern is subsequently presented to the primary retina in recognition mode, each recognition element connected thereto that recognizes a subpattern has its count read by the processor. The processor adds the counts of all such connected recognition elements to compute a value which indicates the degree to which the test pattern is likely to have the particular feature.

BRIEF DESCRIPTION OF THE DRAWINGS

The invention will be described in greater detail below by way of reference to the following drawings, in which:

FIG. 6 is a set of training patterns according to the invention;

FIG. 7 is a set of test patterns according to the invention;

DETAILED DESCRIPTION OF THE DRAWINGS

For convenience of reference, the term "pattern" will be used herein to designate the digitized form of an input to the pattern recognition apparatus. However, the invention should not be construed as limited to digital systems. The term "feature" will be used herein to designate an element that multiple patterns have in common. For example, digitized images of three different spherical objects would constitute three separate patterns. An element that these patterns have in common, e.g., being spherical objects, would be a feature.

Figure 1:
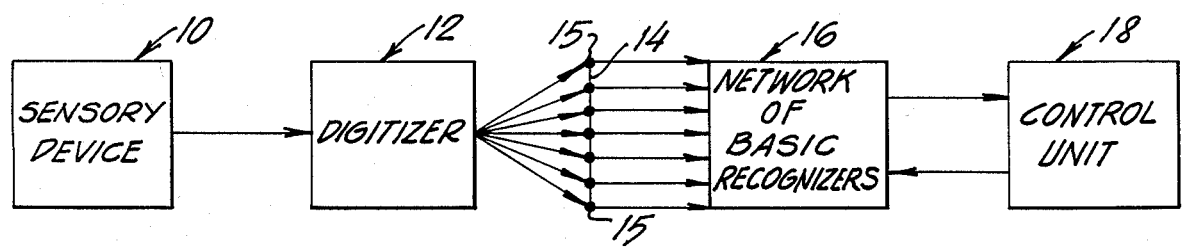
FIG. 1 is a schematic diagram of a pattern recognition apparatus according to one embodiment of the invention.

One embodiment of the invention is illustrated in the drawing of FIG. 1. The embodiment of FIG. 1 includes a sensory device 10, a digitizer 12, a data array ("primary retina") 14, a hierarchical network of basic recognizers 16, and a control unit 18. The sensory device 10 (which may be, for example, a keyboard, a video camera, or a microphone) converts an input into an electronic signal. The digitizer 12 partitions the signal into many small segments and assigns a discrete value (e.g., 0 or 1) to each. These values are then entered on respective bits 15 of the primary retina 14 either for learning (in learn mode) or for possible recognition of a previously learned pattern (in recognition mode). The primary retina 14 thus serves as an input register for a pattern p, pre-processed by the electronic sensory device 10 and digitizer 12. In the illustrated embodiment, each bit 15 of the primary retina 14 holds a single piece of information (e.g., 0 or 1).

The individual basic recognizers 17 (see FIG. 2) examine either bits 15 of the primary retina 14, output bits 32 of lower level basic recognizers, or a combination of both. Each basic recognizer 7 (see FIG. 3) may comprise a plurality of recognition elements 22, a processor 24, and an output bit 32.

A recognition element 22 has a plurality of branching input connectors 26 which may be connected to either bits 15 of primary retina 14, output bits 32 of lower level basic recognizers, or both. Preferably, all recognition elements 22 of a given basic recognizer 7 will have the same number of input connectors. For example, each recognition element 22 of FIG. 3 has three input connectors 26. However, separate basic recognizers may have a different number of input connectors per recognition element (e.g., greater than 3) provided that each recognition unit within a given basic recognizer has the same number of input connectors.

Each input connector 26 preferably includes a logic unit 34 that may be assigned a discrete condition that it is to recognize. For example, each logic unit 34 may be assigned a numerical representation of a particular "color" chosen from the color spectrum (e.g., white being "0" and black being "1"). When the bit 15 to which an input connector 26 is connected receives the color to which that input connector's logic unit 34 has been assigned, the logic unit 34 transmits a response via the input connector 26 to the recognition element 22. For all other colors seen by the logic unit 34, the logic unit does not transmit a response. As preferably embodied, an recognition element 22 "sees" a pattern p provided each of its input connectors 26 "sees" a bit from a pattern p either applied to the primary retina 14 or produced as an output of a lower level basic recognizer (i.e., each input connector's logic unit transmits a response via that input connector).

Each recognition element 22 of basic recognizer 7 functions as a small independent recognition unit capable of making an approximate determination as to whether or not a particular feature is present on the primary retina or on lower level outputs. The processor 24 determines which of the recognition elements 22 of the basic recognizer 7 see patterns in order to make a final determination as to the presence of a feature in a given pattern. The more recognition elements that are assigned to the detection of a particular feature, the more accurate may be the final judgment of the basic recognizer as to the presence or absence of that feature.

Adding more recognition elements may increase the accuracy of the system and deleting recognition elements may reduce the accuracy of the system. In a preferred embodiment, no single recognition element will be critical to the operation of the system.

Figure 9:
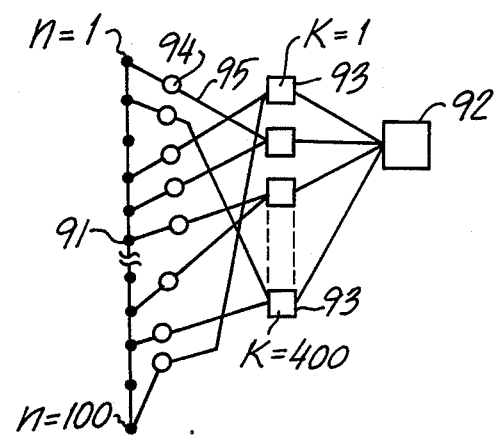
FIG. 9 is an illustrative example of one embodiment according to the invention.

The operation of the learning and recognition modes of the invention will be described by way of reference to an example embodiment. In the example embodiment, illustrated in part in FIG. 9, a pattern recognition apparatus is configured with a one hundred bit (n=100) primary retina 91 and five basic recognizers 92, each to be trained to recognize one of five different features (for example, features being the numerals "0", "1", "2", "3", and "4", respectively). In this embodiment, there are a total of four hundred (k=400) recognition elements 93 for each of the five basic recognizers, each recognition element having two (m=2) input connectors 94. FIG. 9 is a sectional view of this example embodiment illustrating one of the basic recognizers and its connections to the primary retina.

Figure 8:
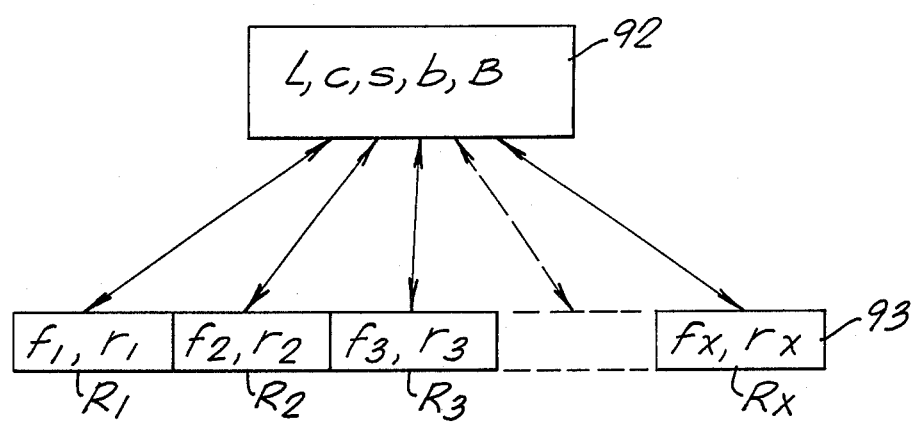
FIG. 8 is a data diagram in accordance with a preferred embodiment of the invention.

In the course of operation in the learning mode and the recognition mode, several data items may be stored in the basic recognizers 92 and in the recognition elements 92, as illustrated in FIG. 8. The basic recognizer 92 may store, for example, a learning constant L, a learning cycle count c, an estimate s of the average number of recognition elements that have seen a pattern having a feature to be learned, an average likelihood b of the presence of the feature to be learned for a plurality of patterns having the feature, and a forgetting constant B. The recognition elements 93 may store a recognition flag $f_i$ and a recognition element count $r_i$. Each of these data items and constants will be explained in detail further below.

A learning mode according to the invention will now be described by way of reference to the flow chart of FIG. 4 for the embodiment of FIG. 9. On entering learn mode (step I), numerous system variables are initialized to zero. These include the learning cycle count c which is a count of all training patterns presented to the primary retina in learning mode; an estimate s of the average number of recognition elements that have seen a pattern having a feature to be learned; an average likelihood b of the presence of the feature for a plurality of patterns having the feature to be learned; and for each recognition element $R_i$ ($1 \leq i \leq x$, where x is the total number of recognition elements in the basic recognizer) of the basic recognizer 7, the recognition element count $r_i$ which is a count of the number of patterns having the feature to be learned that have been seen by the recognition element 93 during the learning mode.

Thereafter, the primary retina 91 is presented with a set of training patterns each having the feature to be learned. Training patterns presented to the primary retina 91 will, in the example of FIG. 9, be divided into one hundred segments (ten by ten), each segment corresponding to a bit n of the primary retina. The segments will be assigned to a value 0 or 1, corresponding to black or white, and the values entered on the retinal bit n (step II). This input procedure will eventually be performed for each pattern of a training set for each of the features to be learned.

For example, FIG. 6 illustrates five training sets of four training patterns each for five features "0", "1", "2", "3", and "4". For each feature "0"–"4" of the example of FIG. 6, the training set contains four somewhat different patterns having the feature to be learned.

In the embodiment of FIG. 9, each of five basic recognizers 92 is trained to recognize one of the five features of FIG. 6 by having each recognition element $R_i$ of the basic recognizer maintain a count $r_i$. As discussed above, $r_i$ is initially set to 0 (step I). During the learning mode, if a recognition element $R_i$ sees a pattern feature it is set to recognize the recognition element increments its count $r_i$ by 1; otherwise, its count remains unchanged. After each of the five basic recognizers has been trained with its four-pattern training set, the count $r_i$ of its $i^{th}$ recognition element $R_i$ will be exactly equal to the number of training patterns it has been: 0, 1, 2, 3, or 4.

For example, during the presentation of the training set of FIG. 6, substantially all recognition elements of a basic recognizer specifically configured to recognize the feature "0" would have a recognition element count $r_i$ of 4 after patterns $A_0$ through $D_0$ have been presented to the primary retina. The final recognition element counts $r_i$ may then be stored within each recognition element (see FIG. 8) for later use in recognition mode. When the learning step is completed, the total number c of training patterns having been presented to each basic recognizer (hereafter the "learning cycle count") is stored in memory in the basic recognizer. For the example training sets of FIG. 6, c=4.

Preferred embodiments of the invention will also include a large "learning constant" L which may be used as described below to program memory degradation. The learning constant L may be set for each basic recognizer to be the largest integer that each of its recognition elements can represent. The learning constant, although a large number, may be over time, less than the number of training patterns shown to the pattern recognition device during the course of its operation. The learning constant L may be stored in memory within each basic recognizer for its recognition elements and is used during the learning mode in preferred embodiments of the invention to separate a "training submode" (c<L) from a "reinforcement submode" (c≧L). For the example training set of FIG. 6, L=4.

Thus, when the primary retina 91 is presented with a pattern p having the feature that is to be learned by a basic recognizer 92, the basic recognizer checks to see if the learning cycle count c is less than the learning constant L for its recognition elements (step III). Memory degradation may thus be programmed to take effect after L learning cycles have been completed. This may be accomplished by establishing as a "forgetting constant" B a positive number slightly less than 1. This "forgetting constant" B may likewise be stored in the memory of the basic recognizer. Thereby, if a recognition element stores a count of $r_i$ at the end of a given learning cycle, at the beginning of the next learning cycle, the stored value may be degraded by the forgetting constant to a new value $Br_i$.

If the constants L and B are chosen so that $B = 1 - 1/L$ then $(L/c)r_i$ will represent an estimate of the number of patterns that recognition element $R_i$ would see out of L patterns chosen having feature F. During the first L learning cycles, a basic recognizer 92 operates in a "training submode" and the recognition element count $r_i$ is computed as the number of patterns that recognition element $R_i$ has seen (step V). Once the learning cycle count c becomes equal to or greater than the learning constant L, the basic recognizers 92 operate in a "reinforcement submode" (step IV) and the recognition element count $r_i$ is degraded, for example, by multiplying it by the forgetting constant B to $Br_i$ before being incremented.

If the learning cycle count c is less than the learning constant L, the recognition element count $r_1$ is incremented by one if that recognition element 93 sees a pattern p it is learning to recognize; otherwise, the recognition element count $r_i$ is not incremented. (Step III) If the learning cycle count c is greater than or equal to the learning constant L, the recognition element $r_i$ count is degraded by multiplying it by the forgetting constant B. Then, if that recognition element sees pattern p, the degraded recognition element count $Br_i$ is incremented by one; otherwise, the decremented recognition element count $Br_i$ remains unchanged. The recognition element count $r_i$ is then stored in memory (for example, within the recognition element (see FIG. 8)) for later use during the recognition mode.

Figure 4:
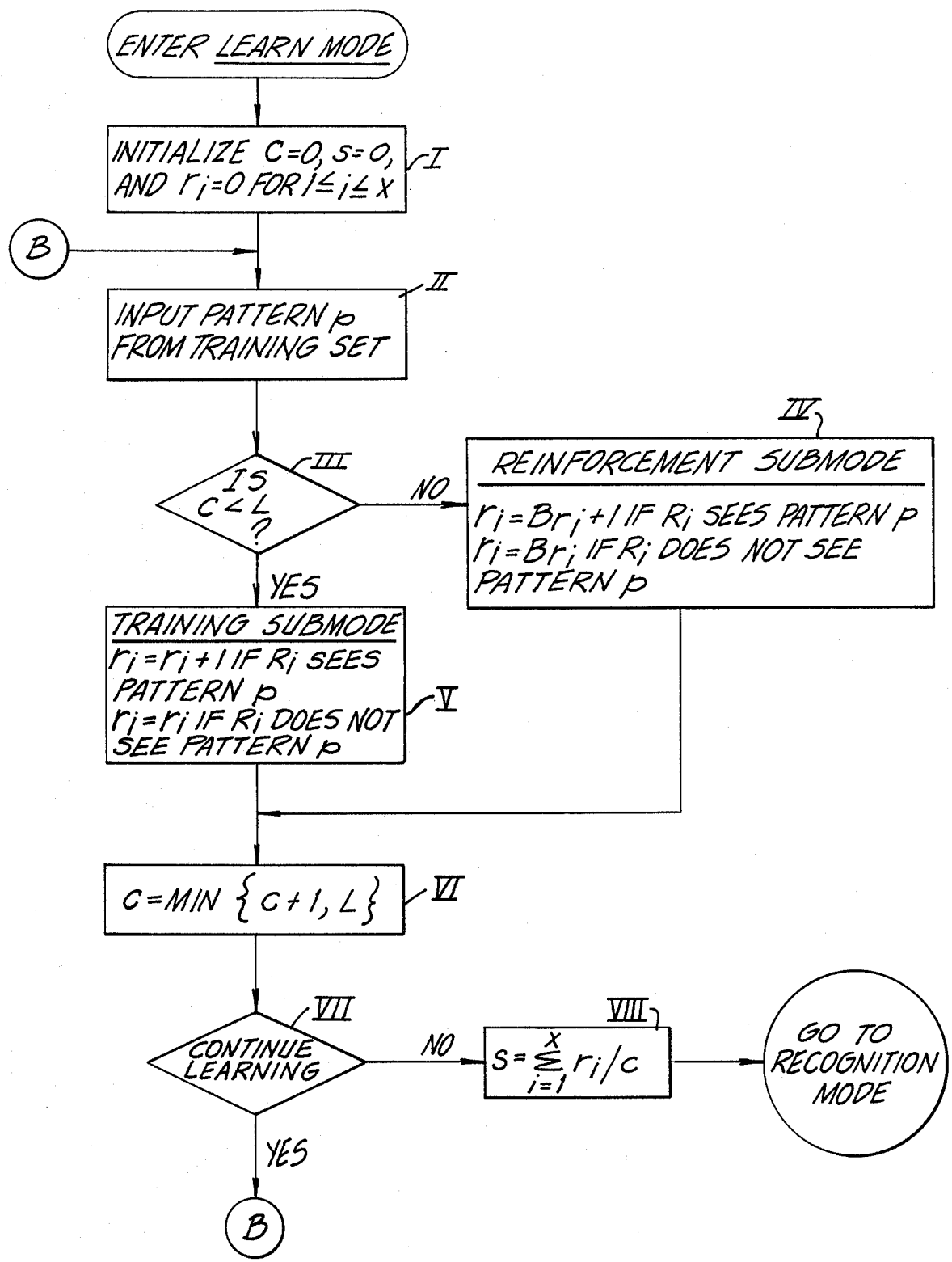
FIG. 4 is a flow diagram of a learning procedure according to the invention.

In the algorithm of FIG. 4, after a training pattern has been presented, the learning cycle count c is set equal to the minimum of either the learning cycle count plus one (c+1) or the learning constant L and this minimum value is then stored, for example, within the basic recognizer (step VI). If there are more patterns to be learned (step VII), the next training pattern is input on the primary retina 91 and the above-described learning process is repeated for each subsequent pattern.

When the last pattern of the training set has been presented, an estimate s is calculated for each basic recognizer of the average number of its recognition elements that see a pattern having the feature F that it has learned to recognize. Estimate s is equal to the sum of each recognition element count $r_i$ divided by the learning cycle count c for all recognition elements in each basic recognizer (x being the total number of recognition elements in the basic recognizer), as follows (step VIII):

$$s = \sum_{i=1}^{x} r_i/c$$

These estimates s are stored in memory in the basic recognizers for use in recognition mode. Thereafter, the basic recognizers are ready to enter recognition mode for possible recognition of learned features within patterns not presented by their respective learning sets.

Switching to recognition mode (FIG. 5), the average likelihood of the present of a feature F within the patterns presented during the learning mode is calculated for each basic recognizer as the sum of the squares of the recognition element counts for all of its recognition elements divided by the learning cycle count squared, multiplied by the estimate of the average number of recognition elements that have seen a pattern having the feature, as follows (step X):

$$b = (1/c^2 s) \sum_{i=1}^{x} (r_i)^2$$

The average likelihood b is then stored in memory in the basic recognizer for later use.

The average likelihood b can be calculated by each basic recognizer for the feature it learned to recognize during its learning mode. Examples of such likelihoods for the training set of FIG. 6 and the embodiment of FIG. 9 are as shown in Table I in the row labeled k=400 (i.e. the case where the number of recognition elements in each basic recognizer is equal to four hundred). The average likelihood b serves as a basis for evaluating whether or not an arbitrary pattern presented to the primary retina has the feature. The average likelihood for each of the features that the basic recognizers have been taught to recognize may be stored in memory in each of the basic recognizers.

It will be appreciated from Table I that, as the number k of recognition elements in the pattern recognition apparatus decreases (e.g., k=200 or k=100), the average likelihood b for the patterns having the feature to be learned decreases as well. Thus, it is advantageous to use the largest number of recognition elements practicable to allow sufficient margin for error in determining whether a feature is present.

The operation of a recognition mode according to the invention will be described by way of an example to the test patterns of FIG. 7. During a recognition mode, each of the basic recognizers 92, previously trained to recognize the features "0" to "4", are presented with the twenty test patterns (A through T) shown in FIG. 7 (step XI). When an arbitrary test pattern q (i.e., any one of the twenty test patterns) is entered on the primary retina 91, those recognition elements 93 which see the arbitrary pattern q (i.e., all those in which logic units 94 of input connectors 95 of that recognition element 93 transmit a response) set a recognition flag $f_i$ equal to one (see FIG. 8). Those recognition elements that do not see the arbitrary pattern q set their recognition flag $f_i$ equal to zero.

The processor 24 of each basic recognizer next sums the recognition element counts $r_i$ for each of its recognition elements $R_i$ that see pattern q to make a determination as to whether or not arbitrary pattern q has feature F (step XII). A recognition element with a high recognition element count $r_i$ and seeing arbitrary pattern q provides evidence that arbitrary pattern q has feature F. A recognition element with a low recognition element count $r_i$ and seeing arbitrary pattern q provides evidence that arbitrary pattern q does not have feature F.

Each basic recognizer 17 then computes $b_q$, the estimate of the likelihood that the arbitrary pattern q has the feature F, by summing the recognition element counts $r_i$ for those recognition elements that see arbitrary pattern q for all recognition elements in the basic recognizer (x being the total number of recognition elements in the basic recognizer) and dividing the sum by the learning cycle count multiplied by the estimate of the average number of recognition elements that see a pattern having the feature, as follows:

$$b_q = (1/cs) \sum_{i=1}^{x} f_i r_i$$

As stated above, which recognition elements see arbitrary pattern q may be determined by checking the recognition flag of each recognition element. If the recognition flag $f_i$ is equal to one, the recognition element count $r_i$ is summed and the recognition flag reset to zero; otherwise, the recognition element count is not summed.

The likelihood that arbitrary pattern q has a feature F may then be evaluated (step XIII) by comparing $b_q$ with the stored value b (b being an average value of likelihood estimates $b_q$ where arbitrary pattern q ranges over the training patterns for that basic recognizer). One example of such a comparison is to calculate the quotient $b_q/b$. The closer this quotient is to one, the more likely it is that arbitrary pattern q has feature F. The closer the quotient is to zero, the less likely it is that arbitrary pattern q has feature F. Acceptable discrimination levels for the quotient may be determined in learn mode by comparing quotients for near-miss patterns with those of patterns having the feature to be learned. If, as a result of the comparison, an arbitrary pattern q has been determined to be likely to have feature F, a number one is output by the basic recognizer as a response (step XV); otherwise, a zero may be output (step XIV).

If there are more patterns to be tested (step XVI), the next test pattern is input on the primary retina 14 and the above-described recognition process is repeated for each subsequent test pattern.

Referring to the example of FIG. 9, each of the five trained basic recognizers in recognition mode maybe presented with a new pattern, pattern R of FIG. 7 for example, on the primary retina 91 which did not occur in any of the training sets. The recognition elements of the basic recognizer trained on feature "2" which "see" pattern R will tend to be the ones that saw many (e.g., 3 or 4) patterns during the learning process. As a result, this basic recognizer may compute a high value of likelihood estimate $b_q$ when arbitrary pattern q is pattern R. The other four basic recognizers may tend to compute a low value of likelihood estimate $b_q$ since their recognition elements which see pattern R tended not to have seen the training patterns corresponding to feature "2" and therefore have low recognition element counts (e.g., 0, 1, or 2).

Empirical results for features "0" through "4" for each test pattern of FIG. 7 is shown in Table II based on the training set of FIG. 6 and the embodiment of FIG. 9. For each test pattern of FIG. 7, in Table II, the quotient closest to 1, marked with an "*", indicates which of the features ("0" through "4") the test pattern was predicted to have. Under the row "Test Pattern R" of Table II, the quotients $b_q/b$ computed by each of the five basic recognizers is an evaluation of the likelihood of the presence of its respective learned feature. It will be appreciated that the largest value, 0.70, is computed by the recognizer that was trained for feature "2". Table II shows similar correct recognition of all test patterns except P and S, whose recognition may require a more extensive embodiment.

In those cases where the patterns were most clearly discernable, as in patterns A through D of FIG. 7 (which are identical to certain members of the training set of FIG. 6), the decision was able to be made with a substantial margin of error. Successful recognition of the other patterns illustrates a reasonable tolerance for background noise and distortion, which begins to be lost in the last row of FIG. 7 (P through T) which contained the most distorted features within the input pattern.

The erroneous choices for patterns P and S suggest potential limitations of the small training set and the small number (in the above example equal to 2) of input connectors per recognition element presented in the example. With more recognition elements per basic recognizer and more input connectors per recognition element, an improved margin of error would likely be obtained.

The significance of the recognition element size (the number of input connectors connected to the recognition element) can be understood as follows: a large recognition element size provides a basic recognizer with a high resolution view of a very limited field of patterns. For example, where the recognition element size is equal to the primary retina size, there would be perfect recognition of the training set but no ability to generalize. A small recognition element size provides a basic recognizer with a broad, but low resolution view of a wide field. An effective pattern recognition apparatus may therefore include a number of simple basic recognizers working together to recognize the same feature at different resolution levels.

In one preferred embodiment of the invention, particular basic recognizers are "assigned" to recognize particular features. Different choices of recognition elements assigned to different basic recognizers may result in basic recognizers with quite different characteristics. Such differently configured basic recognizers may be better suited to recognize different features. Conversely, a basic recognizer all of whose recognition elements attach to one portion of the primary retina, for example, would be unable to recognize an image on another portion.

A basic recognizer well-suited to recognize a feature F is one whose recognition elements most frequently see patterns having the feature F. In other words, of all of the basic recognizers in the system, the basic recognizer best suited to recognize F may be the one with the relatively highest average number of its recognition elements that see a pattern having feature F. This average number s is computed in learn mode (FIG. 4) as described above.

Figure 2:
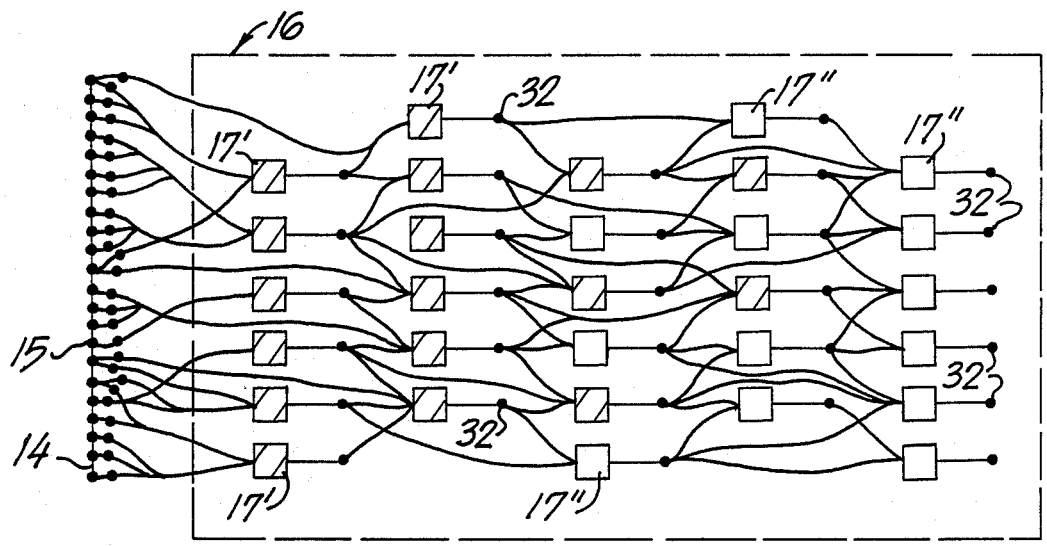
FIG. 2 is a schematic diagram of a hierarchical network of basic recognizers in accordance with a preferred embodiment of the invention.
Figure 3:
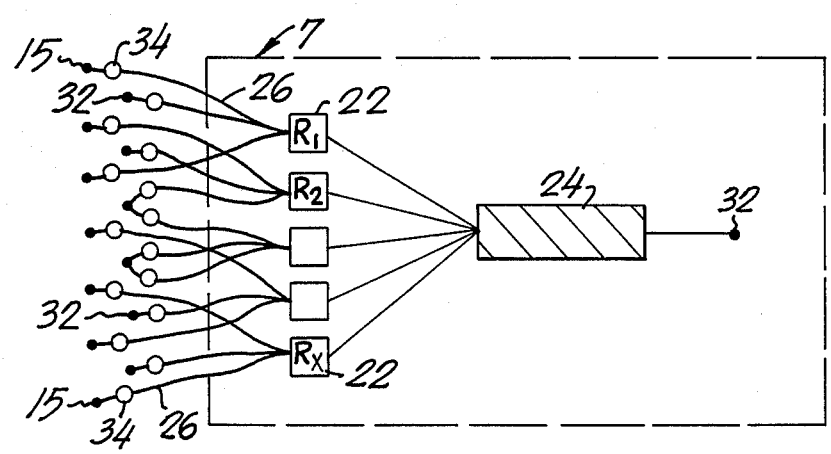
FIG. 3 is a schematic diagram of a single basic recognizer of the pattern recognition apparatus.

The average number s may be maximized using a variety of different means. For example, one way to maximize the estimate s of the average number of recognition elements that see a pattern having the feature to be learned utilizes a large network comprising basic recognizers which are initially unassigned to any particular feature. FIG. 2 shows such a network at an intermediate stage of learning, where the shaded basic recognizers 17' have each been assigned to recognize a particular feature and where the unshaded basic recognizers 17" remain to be assigned. The pattern recognition apparatus may then be presented with a new feature F to be learned. The control unit 24 may then put all previously assigned basic recognizers in recognition mode and all unassigned basic recognizers in learn mode. The training patterns having a new feature F may then be presented in succession to the primary retina 14. At the end of the learning process, the control unit 24 assigns the unassigned recognizer 17" with the highest value of estimate s to recognize new feature F. Each remaining unassigned basic recognizers has its learning cycle count c, estimate s of the average number of recognition elements that have seen a pattern having the feature F, average likelihood b of the presence of the feature for patterns having the feature, and recognition element counts $r_i$ all reset to zero.

Alternatively, the control unit can oversee the development of a custom recognizer optimally configured to recognize a new feature F. In this embodiment, the control unit 24 may simulate a basic recognizer which has all, or as many as possible, recognition elements 22 with input connectors 26 logically attached to the primary retina bits 15 and the output bits 32 of previously assigned basic recognizers. Only the simulated basic recognizer operates in learn mode (see FIG. 4) as the training patterns for new feature F are presented to the primary retina 14. When the learning process is complete, the control unit 24 selects those recognition elements 22 with the highest recognition element counts $r_i$ to assemble a new custom basic recognizer to be added to the network. The custom recognizer is then assigned to recognize the new feature F.

Since the average number s of recognition elements that have seen a pattern of feature F equals to the sum of all quotients $r_i/c$, $1 \leq i \leq x$, (see FIG. 4), maximizing the values for the recognition element counts $r_i$ results in a maximum value of s. This method provides a preferred basic recognizer for a given feature F.

Figure 5:
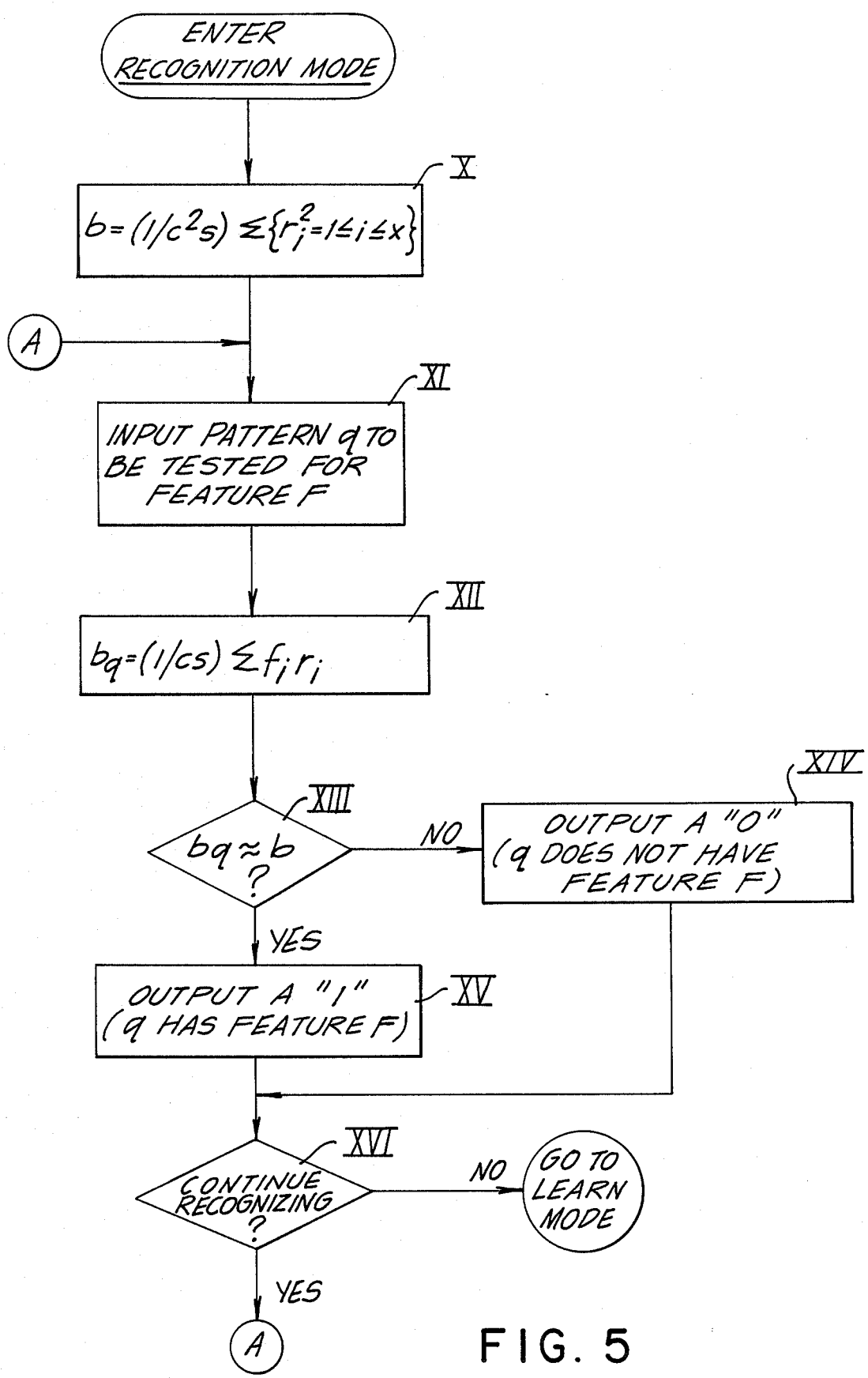
FIG. 5 is a flow diagram of a recognition procedure according to the invention.

Several alternatives to the feature learning and recognition algorithms of FIGS. 4 and 5 are possible, each implementation, and breadth of applicability. making tradeoffs in time efficiency, accuracy, ease of (a) A first alternative embodiment that may be less time efficient in learn mode but more accurate and easier to implement, and still broadly applicable, is as follows. Instead of using the algorithm of FIG. 4 to compute the recognition element count $r_i$, $r_i$ can be set equal to the average number of patterns having the feature to be learned, out of L such patterns, that can be seen by the $i^{th}$ recognition element $R_i$, as follows $$r_i = W_i L / |F|$$

where $W_i$ is the total number of patterns having feature F that can be seen by recognition element $R_i$ and $|F|$ is the total number of patterns having feature F. This variation may be useful in instances where the total number of patterns having feature F is known by the operator and is input to the pattern recognition apparatus. This variation replaces the learning process by a relatively lengthy computation. The calculation of the estimate of the average number of recognition elements that have seen a pattern having feature F may thus be accomplished using the formula $$s = \sum_{i=1}^{x} W_i / |F|$$

(b) A second alternative embodiment which may be less time efficient, but higher in accuracy and ease of implementation, generally applies only to bottom level recognizers looking directly at primary retina 14. In this variation, the total number of patterns having feature F is known by the operator and is input to the pattern recognition apparatus. In addition, arbitrary pattern q is known to be a pattern having feature F.

In this embodiment, the learning mode is omitted and instead of using the algorithm of FIG. 5 to compute the likelihood estimate $b_q$, $b_q$ is computed directly by the formula $$b_q = \frac{1}{|F|} \sum_{p \in F} \frac{e(p,q)!}{m!(e(p,q) - m)!} \Big/ \frac{n!}{m!(n - m)!}$$

where the patterns used in learn mode may be utilized directly. Here, $|F|$ is the total number of patterns having feature F, $e(p,q)$ is the number of bits on which patterns p having feature F to be learned and pattern q to be tested have the same "color", n is the number of retinal bits on the primary retina, m is the number of input connectors per recognition element, and the summation is over all patterns p of the training set having the feature F. According to the above formula, arbitrary pattern q is compared with each pattern p of the training set, one at a time, and summed.

Average likelihood b is calculated by:

$$b = \frac{1}{|F|} \sum_{p,q \epsilon F} \frac{e(p,q)!}{m!(e(p,q) - m)!} \bigg/ \frac{n!}{m!(n - m)!}$$

where the summation is over all patterns p of the training set and pattern q to be tested having the feature F. According to the formula for calculating average likelihood b, both the pattern p and pattern q are patterns that range over the entire training set. Thus, all patterns of the training set are compared to each other, two patterns at a time, to establish an average value of the likelihood $b_q$. Thus, this variation can replace an entire basic recognizer with a relatively lengthy computation.

Other variations are also possible. For example, if all colors of the color spectrum were to be entered on the primary retina 14, each retina bit 15 may be replaced by a node comprised of three basic color segments: red, green, and blue. In this manner, all colors of the spectrum may be represented by activating either a single color segment or combinations of color segments corresponding to the desired color. The logic unit 34 of each input connector 26 would be assigned a particular condition that it is to recognize (i.e., a particularly combination of color segments being activated) and upon recognition thereof it would instruct the input connector to transmit a response to the recognition element 22. Similarly, the output bit 32 of each basic recognizer 17 may be replaced by a node comprised of color segments.

Additionally, although the pattern entered on the primary retina 14 may be in one form (e.g., color segments), the output response of various basic recognizers may be in either a similar form or in a different form (e.g., different voltage levels).

Furthermore, the invention may be embodied in a wide variety of manners, including entirely with discrete digital or analog components, virtually entirely in computer software with a hardware interface, or preferrably as a combination of hardware and software. For example, each basic recognizer may comprise a single microprocessor articulating a plurality of transistor circuits each serving as individual recognition elements.

Thus, although the invention has been described in great detail above by way of reference to the examples and the accompanying drawings, the invention should not be construed as not limited to the embodiments herein disclosed but should be interpreted only in accordance with the claims which follow.

TABLE I

| k | FEATURE | | | | |
|---|---|---|---|---|---|
| | 0 | 1 | 2 | 3 | 4 |
| 100 | 0.70 | 0.76 | 0.66 | 0.75 | 0.70 |
| 200 | 0.70 | 0.77 | 0.73 | 0.79 | 0.75 |
| 400 | 0.72 | 0.79 | 0.73 | 0.80 | 0.75 |

TABLE II

| Test Pattern | FEATURE | | | | |
|---|---|---|---|---|---|
| | 0 | 1 | 2 | 3 | 4 |
| A | *1.07 | 0.49 | 0.73 | 0.71 | 0.63 |
| B | 0.61 | *1.01 | 0.79 | 0.76 | 0.67 |
| C | 0.72 | 0.59 | *0.99 | 0.71 | 0.57 |
| D | 0.86 | 0.73 | 0.85 | *1.05 | 0.68 |
| E | 0.64 | 0.51 | 0.55 | 0.56 | *1.01 |
| F | *1.04 | 0.57 | 0.77 | 0.75 | 0.64 |
| G | 0.57 | *0.82 | 0.60 | 0.61 | 0.61 |
| H | 0.74 | 0.61 | *0.97 | 0.71 | 0.51 |
| I | 0.81 | 0.85 | 0.85 | *1.04 | 0.69 |
| J | 0.76 | 0.56 | 0.66 | 0.74 | *0.87 |
| K | *0.92 | 0.70 | 0.71 | 0.73 | 0.85 |
| L | 0.63 | *0.92 | 0.85 | 0.75 | 0.65 |
| M | 0.71 | 0.80 | *0.90 | 0.75 | 0.65 |
| N | 0.76 | 0.80 | 0.81 | *0.85 | 0.60 |
| O | 0.56 | 0.51 | 0.53 | 0.51 | *0.77 |
| P | 0.75 | 0.57 | 0.59 | 0.63 | *0.75 |
| Q | 0.54 | *0.89 | 0.73 | 0.60 | 0.49 |
| R | 0.56 | 0.65 | *0.70 | 0.51 | 0.43 |
| S | 0.75 | 0.62 | *0.75 | 0.74 | 0.55 |
| T | 0.56 | 0.46 | 0.44 | 0.53 | *0.69 |

What is claimed is:

1. A method of pattern learning, comprising the steps of:
    (a) entering a pattern having a feature to be learned on a primary retina of a pattern recognition apparatus comprising a plurality of basic recognizers, each basic recognizer including a plurality of recognition elements;
    (b) for each recognition element of each basic recognizer of said pattern recognition apparatus, if a learning cycle count is less than a learning constant and if the recognition element sees the pattern having the feature to be learned, incrementing by one a count of the number of patterns having the feature to be learned that have been seen by that recognition element;
    (c) for each recognition element of each basic recognizer of said pattern recognition apparatus, if said learning cycle count is greater than or equal to said learning constant, reducing said count of the number of patterns having the feature to be learned that have been seen by that recognition element as a factor of the number by a forgetting constant consisting of a positive number less than 1;
    (d) for each recognition element of each basic recognizer of said pattern recognition apparatus, if said learning cycle count is greater than or equal to said learning constant and if the recognition element sees the pattern having the feature to be learned, incrementing by one the count of the number of patterns having the feature to be learned that have been seen by that recognition element;
    (e) for each basic recognizer, setting said learning cycle count equal to the lessor of said learning cycle count plus one or said learning constant; and
    (f) for each basic recognizer of said pattern recognition apparatus, calculating an estimate of the average number of recognition elements that have seen a pattern having the feature to be learned.

2. A method of pattern learning and feature discrimination according to claim 1, wherein said estimate of the average number of recognition elements that have seen a pattern having the feature to be learned is calculated by the formula $$s = \sum_{i=1}^{x} r_i/c$$

where s is the estimate of the average number of recognition elements that see a pattern having the feature to be learned, x is a count of the total number of recognition elements in the basic recognizer, $r_i$ is the count of the number of patterns having the feature to be learned that have been seen by that recognition element, and c is the learning cycle count.

3. A method of pattern learning and feature discrimination according to claim 1, feature comprising the steps of repeating (a) through (e) above for each additional pattern to be learned.

4. A method of pattern recognition, comprising the steps of:
 (a) calculating an average likelihood of the presence of a feature for a plurality of patterns having the feature that have been entered on a primary retina of a pattern recognition apparatus having a plurality of basic recognizers, each basic recognizer including a plurality of recognition elements;
 (b) entering a pattern to be tested on said primary retina;
 (c) calculating a likelihood of the presence of the feature for said pattern to be tested;
 (d) if said likelihood of the presence of the feature for the pattern to be tested approximates said average likelihood of the presence of the feature for plurality of patterns having the feature, outputting a response indicating the presence of the feature;
 (e) if said likelihood that the pattern to be tested has the feature does not approximate said average likelihood for patterns having the feature, outputting a response indicating the absence of the feature; and
wherein said average likelihood of the presence of the feature for a plurality of patterns having the feature is calculated by the formula $$b = (1/c^2 s) \sum_{i=1}^{x} (r_i)^2$$

wherein b is the average likelihood of the presence of the feature for a plurality patterns having the feature, c is a learning cycle count, s is an estimate of the average number of recognition elements that have seen a pattern having the feature, x is a count of the total number of recognition elements in the basic recognizer, and $r_i$ is a count of the number of patterns having the feature that have been seen by that recognition element.

5. A method of pattern recognition, comprising the steps of:
 (a) calculating an average likelihood of the presence of a feature for a plurality of patterns having the feature that have been entered on a primary retina of a pattern recognition apparatus having a plurality of basic recognizers, each basic recognizer including a plurality of recognition elements;
 (b) entering a pattern to be tested on said primary retina;
 (c) calculating a likelihood of the presence of the feature for said pattern to be tested;
 (d) if said likelihood of the presence of the feature for the pattern tobe tested approximates said average likelihood of the presence of the feature for plurality of patterns having the feature, outputting a response indicating the presence of the feature;
 (e) if said likelihood that the pattern to be tested has the feature does not approximate said average likelihood for patterns having the feature, outputting a response indicating the absence of the feature; and
wherein said likelihood of the presence of the feature for the pattern to be tested is calculated by the formula $$b_q = (1/cs) \sum_{i=1}^{x} f_i r_i$$

where $b_q$ is the likelihood of the presence of the feature for the pattern q to be tested, c is a learning cycle count, s is an estimate of the average number of recognition elements that have seen a pattern having the feature, x is a count of the total number of recognition elements in the basic recognizer, $r_i$ is a count of the number of patterns having the feature that have been seen by that recognition element, and $f_i$ is a recognition flag for that recognition element.

6. A method of pattern recognition, comprising the steps of:
 (a) calculating an average likelihood of the presence of a feature for a plurality of patterns having the feature that have been entered on a primary retina of a pattern recognition apparatus having a plurality of basic recognizers, each basic recognizer including a plurality of recognition elements;
 (b) entering a pattern to be tested on said primary retina;
 (c) calculating a likelihood of the presence of the feature for said pattern to be tested;
 (d) if said likelihood of the presence of the feature for the pattern to be tested approximates said average likelihood of the presence of the feature for plurality of patterns having the feature, outputting a response indicating the presence of the feature;
 (e) if said likelihood that the pattern to be tested has the feature does not approximate said average likelihood for patterns having the feature, outputting a response indicating the absence of the feature; and
wherein said average likelihood of the presence of the feature for a plurality of patterns having the feature is calculated by the formula $$b = (1/c^2 s) \sum_{i=1}^{x} (r_i)^2$$

wherein b is the average likelihood of the presence of the feature for a plurality of patterns having the feature, c is a learning cycle count, s is an estimate of the average number of recognition elements that have seen a pattern having the feature, x is a count of the total number of recognition elements in the basic recognizer, and $r_i$ is a count of the number of patterns having the feature seen by that recognition element.

7. A method of pattern recognition, comprising the steps of:
 (a) calculating an average likelihood of the presence of a feature for a plurality of patterns having the feature that have been entered on a primary retina of a pattern recognition apparatus having a plurality of basic recognizers, each basic recognizer including a plurality of recognition elements;

(b) entering a pattern to be tested on said primary retina;

(c) calculating a likelihood of the presence of the feature for said pattern to be tested;

(d) if said likelihood of the presence of the feature for the pattern to be tested approximates said average likelihood of the presence of the feature for plurality of patterns having the feature, outputting a response indicating the presence of the feature;

(e) if said likelihood that the pattern to be tested has the feature does not approximate said average likelihood for patterns having the feature, outputting a response indicating the absence of the feature; and wherein said average likelihood of the presence of the feature for a plurality of patterns having the feature is calculated by the formula $$b = \frac{1}{|F|} \sum_{p,q \in F} \frac{e(p,q)!}{m!(e(p,q) - m)!} \bigg/ \frac{n!}{m!(n - m)!}$$

where b is the average likelihood of the presence of the feature for a plurality of patterns having a feature F, $|F|$ is a count of the total number of patterns having the feature F, $e(p,q)$ is the number of individual bits on which the pattern q to be tested and pattern p having a feature be learned have the same input on the primary retina, m is the number of input connectors per recognition element, and n is the number of individual bits on said primary retina.

8. A method of pattern recognition, comprising the steps of:

(a) calculating an average likelihood of the presence of a feature for a plurality of patterns having the feature that have been entered on a primary retina of a pattern recognition apparatus having a plurality of basic recognizers, each basic recognizer including a plurality of recognition elements;

(b) entering a pattern to be tested on said primary retina;

(c) calculating a likelihood of the presence of the feature for said pattern to be tested;

(d) if said likelihood of the presence of the feature for the pattern to be tested approximates said average likelihood of the presence of the feature for plurality of patterns having the feature, outputting a response indicating the presence of the feature; and (e) if said likelihood that the pattern to be tested has the feature does not approximate said average likelihood for patterns having the feature, outputting a response indicating the absence of the feature; and wherein said likelihood of the presence of the feature for the pattern to be tested is calculated by the formula $$b = \frac{1}{|F|} \sum_{p,q \in F} \frac{e(p,q)!}{m!(e(p,q) - m)!} \bigg/ \frac{n!}{m!(n - m)!}$$

where $b_q$ is the likelihood of the presence of a feature F for the pattern q to be tested, $|F|$ is a count of the total number of patterns having the feature F, $e(p,q)$ is a count of the number of individual bits on which pattern p having a feature to be learned and pattern q to be tested have the same inputs on the primary retina, m is a count of the number of input connectors per recognition element, and n is a count of the number of individual bits on the primary retina.

9. A method of pattern recognition according to claim 4, which further includes the step of calculating the quotient of said likelihood of the presence of the feature for the pattern to be tested divided by said average likelihood of the presence of the feature for a plurality of patterns having the feature.

10. A method of pattern learning, comprising the steps of:

(a) entering a pattern having a feature to be learned on a primary retina of a pattern recognition apparatus comprising a plurality of basic recognizers, each basic recognizer including a plurality of recognition elements;

(b) for each recognition element of each basic recognizer of said pattern recognition apparatus, calculating an average number of patterns having a feature to be learned that can be seen by a recognition element;

(c) for each basic recognizer of said pattern recognition apparatus, setting a learning cycle count equal to the lessor of said learning cycle count plus one or a learning constant equal to the largest number that the recognition elements of said basic recognizer can represent;

(d) for each basic recognizer of said pattern recognition apparatus, calculating an estimate of the average number of recognition elements that have seen a pattern having the feature to be learned.

11. A method of pattern learning according to claim 10, wherein said average number of patterns having a feature to be learned that can be seen by the recognition element is calculated by the formula $$r_i = W_i L / |F|$$

where $r_i$ is the average number of patterns having the feature to be learned that can be seen by the recognition element, $W_i$ is a count of the total number of patterns having the feature to be learned that can be seen by the recognition element, L is a learning constant, and $|F|$ is a count of the total number of patterns having the feature to be learned.

12. A method of pattern learning according to claim 10, wherein said estimate of the average number of recognition elements that have seen a pattern having the feature to be learned is calculated by the formula $$s = \sum_{i=1}^{x} W_i / |F|$$

where s is an estimate of the average number of recognition elements that see a pattern having the feature to be learned, x is a count of the total number of recognition elements in the basic recognizer, $W_i$ is a count of the total number of patterns having the feature to be learned that can be seen by the recognition element, and $|F|$ is a count of the total number of patterns having the feature to be learned.

13. A method of pattern recognition, comprising the steps of:

(a) entering a pattern having a feature to be learned on a primary retina of a pattern recognition apparatus comprising a plurality of basic recognizers, each basic recognizer including a plurality of recognition elements; and (b) for each basic recognizer of said pattern recognition apparatus, calculating an estimate of the average number of recognition elements that have seen a pattern having the feature to be learned; and wherein said estimate of the average number of recognition elements that have seen a pattern having the feature to be learned is calculated by the formula $$s = \sum_{i=1}^{x} r_i/c$$

where s is an estimate of the average number of recognition elements that have seen a pattern having a feature to be learned, x is a count of the total number of recognition elements in the basic recognizer, $r_i$ is a count of the number of patterns having the feature to be learned that have been seen by the recognition element, and c is a learning cycle count.

14. A method of pattern learning, comprising the steps of:
(a) entering a pattern having a feature to be learned on a primary retina of a pattern recognition apparatus comprising a plurality of basic recognizers, each basic recognizer including a plurality of recognition elements;
(b) for each recognition element of each basic recognizer of said pattern recognition apparatus, if the recognition element sees the pattern having the feature to be learned setting a count of the number of patterns having the feature to be learned that have been seen by the recognition element equal to one; and
(c) for each basic recognizer of said pattern recognition apparatus, calculating an estimate of the average number of recognition elements that have seen a pattern having the feature to be learned.

15. A method of pattern learning according to claim 14, wherein said estimate of the average number of recognition elements that have seen a pattern having the feature to be learned is calculated by the formula $$s = \sum_{i=1}^{x} r_i/c$$

where s is the estimate of the average number of recognition elements that have seen a pattern having the feature to be learned, x is a count of the total number of recognition elements in the basic recognizer, $r_i$ is a count of the number of patterns having the feature that have been seen by that recognition element, and c is a learning cycle count.

16. A method of pattern learning discrimination according to claim 14, further comprising the steps of repeating (a) through (b) above for each additional pattern to be learned.

* * * * *